Oct. 7, 1930.  H. L. BROOKES  1,777,909
TEA OR COFFEE POT
Filed Aug. 23, 1927
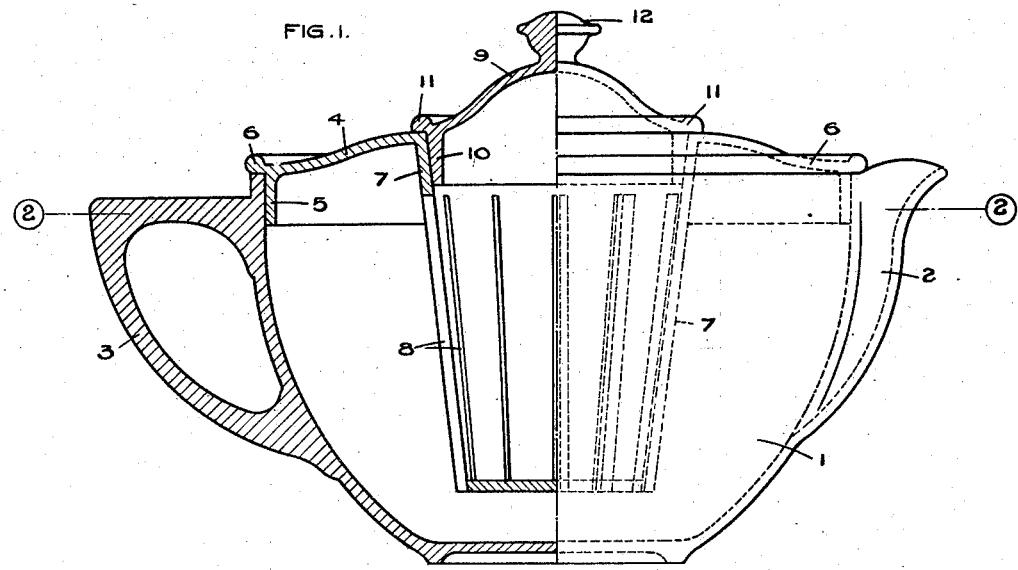
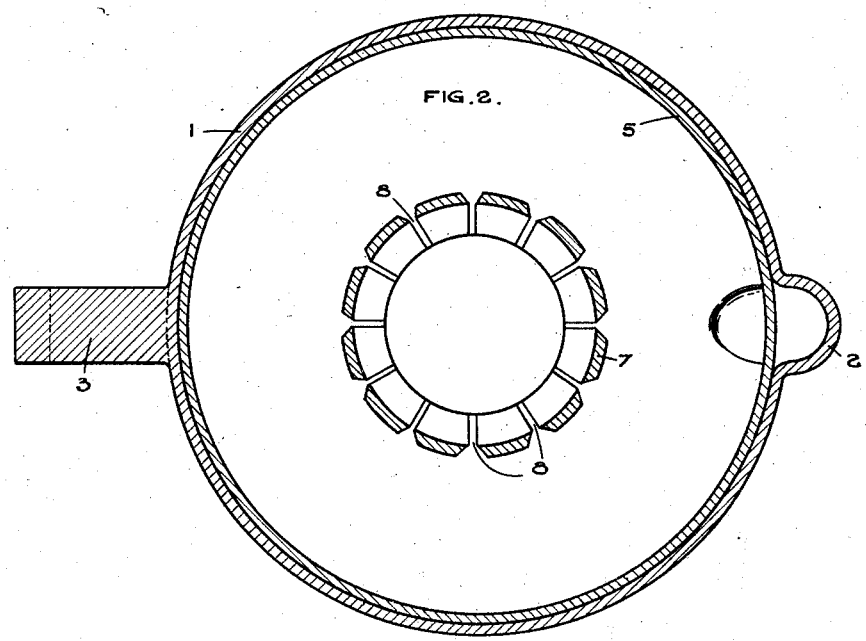
Inventor
Herbert L. Brookes
By Munn & Co.
Attorneys Patented Oct. 7, 1930

1,777,909

UNITED STATES PATENT OFFICE

HERBERT LESLIE BROOKES, OF BIRMINGHAM, ENGLAND

TEA OR COFFEE POT

Application filed August 23, 1927, Serial No. 214,950, and in Great Britain November 20, 1926.

This invention relates to teapots or the like (including coffee pots) and has for its object to provide an improved or simplified construction of teapot or the like which may be made of the usual materials (metal or china) and which will permit the article, if required, to be made partly or wholly of moulded material such as synthetic resin.

In constructing a teapot or the like of moulded material such as synthetic resin, the ordinary construction of teapot is not admissible as great difficulty would be found in extracting the inner part or core of the mould. Further, it would be an extremely difficult matter if not quite impossible to mould a curved tubular spout.

It is therefore proposed to employ a construction of the kind in which the top or upper part of the body of the pot is made separately from the body so that the top or upper part forms a cover for the body, and in which the body is formed with a non-tubular channel like spout.

This enables the body and the cover to be moulded separately by quite simple dies and moulding operations, or to be manufactured separately of metal or china.

One of the features of the present invention is to construct a teapot of the kind described, the interior of the spout and body being free from projections and the pot being produced by moulding in synthetic resin.

A further feature of the present invention is to form the upper part or cover of the body with an integral perforated infuser chamber depending into the body of the pot. This infuser reduces the chance of the upper body part or cover from dropping off when the pot is tilted.

Referring to the drawings:—

Figure 1 is a vertical section of a teapot constructed according to my invention.

Figure 2 is a horizontal section on the line 2—2 in Figure 1.

In the construction illustrated by Figures 1 and 2 of the accompanying drawings, the body 1 of the pot, which may be of metal, china, or moulded synthetic resin, is of bowl like form having at one side a non-tubular lip like spout 2 and having at the opposite side a suitable handle 3, the spout, handle and body being free from internal projections and being moulded in one piece if required.

The largest diameter of the body is at the top so that if moulded, the inner mould can be easily extracted.

The cover consists of a metal, china or moulded member 4 having a depending flange 5 adapted to fit down inside the top of the body and having a peripheral lip 6 which may be of ornamental form.

At a suitable position the cover is provided with an integral infusion chamber 7 which is of cup like form and arranged so that it depends into the body when the cover is in position thereon.

The infuser chamber is of cup like form and slightly tapering with its smaller diameter at the bottom and it may be moulded or formed with a number of radial or other slots 8 having inwardly tapered sides through which the water can pass to the body. Alternatively, the infuser chamber may be provided with a suitable number of perforations instead of slots.

The lid 9 of the pot, which may also be of metal, china, or the moulded material, is formed with a depending flange 10 which fits into the top of the infuser chamber and with a lip 11 which extends around the said flange. The lid may be of any suitable form and if required it is provided with an integral or other knob 12 whereby it may be easily removed.

What I claim then is:—

The combination in a moulded tea or coffee pot of a moulded body of greater diameter at its open end and having walls which continuously diverge from the lower end of the body towards the upper end thereof, an integral moulded handle, a spout formed in the side wall of the said body and in continuous open communication with the interior thereof throughout its length, and the body and spout being free from internal projections, a cover for the said body having an open centre, an infuser open at its upper end and of hollow inverted frustro-conical form closed at its lower end and dependingly supported from the edge of the said open centre of said cover and integral with the cover, said infuser having vertical slit like openings in its wall communicating with the interior of the said teapot, the said openings extending from a short distance from the top of the infuser to the bottom and through the edge of the bottom thereof, the said cover being adapted to entirely separate the interior of the upper part of said infuser from the interior of the body of the pot and the said cover having a deep downwardly extending flange adapted to fit snugly into the upper open end of said body, and a separate lid for said infuser adapted to be supported on said cover and having a depending portion engageable within the open end of the said infuser.

In witness whereof I affix my signature.

HERBERT LESLIE BROOKES.